United States Patent
Chorush et al.

[11] Patent Number: 6,017,453
[45] Date of Patent: Jan. 25, 2000

[54] APPARATUS AND METHOD FOR INLINE REMOVAL OF IMPURITIES FROM WET CHEMICALS

[75] Inventors: Russell A. Chorush, Plano; Jeremiah D. Hogan, Richardson, both of Tex.

[73] Assignee: Texas Instruments Incorporated, Dallas, Tex.

[21] Appl. No.: 09/107,871

[22] Filed: Jun. 30, 1998

Related U.S. Application Data

[60] Provisional application No. 60/051,251, Jun. 30, 1997.

[51] Int. Cl.⁷ .................................................. B01D 15/08
[52] U.S. Cl. ...................... 210/251; 210/263; 210/502.1; 210/500.34
[58] Field of Search ...................................... 210/638, 681, 210/688, 192, 194, 205, 198.1, 251, 263, 500.21, 502.1, 500.34

[56] References Cited

U.S. PATENT DOCUMENTS

| | | | |
|---|---|---|---|
| 4,906,376 | 3/1990 | Fyles | 210/500.28 |
| 4,948,506 | 8/1990 | Lonsdale | 210/490 |
| 5,003,111 | 3/1991 | Harper | 568/618 |
| 5,200,041 | 4/1993 | Simonet | 210/502.1 |
| 5,302,729 | 4/1994 | Gibson | 549/349 |
| 5,426,944 | 6/1995 | Li | 62/617 |
| 5,766,478 | 6/1998 | Smith | 210/638 |
| 5,865,994 | 2/1999 | Riviello | 210/198.2 |

OTHER PUBLICATIONS

Zhao and Bartsch, Journal of Polymer Science, No. 33, pp. 2267–2274 (1995).

*Primary Examiner*—Ernest G. Therkorn
*Attorney, Agent, or Firm*—Jacqueline J. Garner; Wade James Brady; Richard L. Donaldson

[57] ABSTRACT

An apparatus and method for purifying semiconductor silicon wafer processing chemicals in line, the apparatus comprising a non-reactive chemical support, and a crown ether polymer covalently bonded to said non-reactive support, is disclosed. In operation, the crown ether polymer contained within the housing is positioned in-line with a wet chemical recirculation line, transfill system or distribution system.

10 Claims, 2 Drawing Sheets

APPARATUS AND METHOD FOR INLINE REMOVAL OF IMPURITIES FROM WET CHEMICALS

This application claims priority under 35 U.S.C. § 119 (e)(1) of provisional patent application Ser. No. 60/051,251 filed Jun. 30, 1997.

TECHNICAL FIELD OF THE INVENTION

The present invention relates in general to the field of removing impurities from wet chemicals used in the processing of semiconductor silicon wafers and, in particular to, an apparatus and method for removing ionized impurities from wet chemicals.

BACKGROUND OF THE INVENTION

Without limiting the scope of the invention, the background is described in connection with the manufacture of silicon wafers, as an example.

Heretofore, in this field, a series of wet chemicals are used in the processing and washing steps following the deposition of operative layers on silicon wafers. In the process of fabricating modern semiconductor integrated circuits, it is necessary to form conductor lines and other structures above previously formed structures. Irregularities on the surface of silicon wafers may be caused by impurities in wet chemicals that are used in the processing and washing steps, which lead to irregularities during the deposition of subsequent layers.

Irregularities caused by the outplating of ions, such as metallic or organic ions, can easily result in incomplete coverage, breakage in the deposited material or voids when a subsequent layer is deposited directly over the aforementioned highly irregular surfaces. Outplating occurs when ions, normally metallic or organic, reach out from a washing solution, such as hydrofluoric acid, and become deposited on a silicon substrate. Even trace levels of outplated impurities lead to degradation of minority-carrier lifetime as well as premature breakdown of gate oxide layers.

Unfortunately, these irregularities cannot be alleviated at the next major processing step because it is assumed that the top surface topography is at its cleanest following a washing step. Worse yet, these cleaning steps often take place prior to furnace operations which drive surface impurities in to the bulk material. These irregularities tend to become more pronounced as subsequent layers are deposited, causing further problems as the layers stack up in the subsequent processing of the semiconductor structure. Depending upon the type of material and their intended purposes, numerous and undesirable characteristics are produced when outplating irregularities occur. Incomplete coverage of insulating oxide layers can lead to short circuits between metallization layers. Likewise, voids may trap air or process gasses, either contaminating further processing steps, creating weak spots in the film or simply lowering overall device reliability. One problem widely recognized in the wafer manufacturing process is that, in general, processing high density circuits over highly irregular structures can lead to very poor yields in device performance.

Consequently, it is desirable to effect some type of planarization or flattening of integrated circuit structures in order to facilitate the processing of multi layer integrated circuits and to improve their yields, performance and reliability. In fact, all of today's high density integrated circuit fabrication techniques make use of some method of forming planarized structures at critical points in the fabrication process.

Impurities in wet chemicals have been identified by monitoring the yield of silicon chips derived from a silicon wafer. During the fabrication of very large scale integrated circuits, for example, large amounts of wet chemicals are used in the polishing steps that accompany the etching and polishing pieces of silicon wafer manufacture prior to a high temperature operation.

It has been found that present methods of transporting and processing chemicals used in the semiconductor industry leads to an increase in the amount of impurities from the time the chemicals are received to the time that the chemicals are used. These impurities lead to a lower bath life for the processing chemicals due to the increase in ionic contaminants within the bath. As the life of the bath increases, so does the level of these contaminants. The ionic contamination of the process chemicals results in significant costs during semiconductor wafer processing. These costs are derived not only from the need to change the semiconductor processing chemicals but also from the decrease-in-yield cost by the impurities that deposit on the surface of silicon chips.

Therefore, what is needed is a device and method for removing ionic impurities from semiconductor manufacturing chemicals. Also, what is needed is an apparatus and a method that results in significant cost savings and a decreased impact on the environment.

SUMMARY OF THE INVENTION

The present invention solves the problems associated with ionic contaminants in semiconductor wafer processing chemicals. An apparatus and method is disclosed for removing ionic contaminants from semiconductor processing chemicals comprising a polymerized crown-ether film covalently bonded to a non-reactive chemical support.

The present invention is an apparatus and method for decontaminating chemical solutions, referred to as wet chemicals, commonly used for processing semiconductor silicon wafers. More specifically, the present invention is a purifier used to remove ionic impurities and contaminants produced during semiconductor distribution, wherein the inline non-reactive chemical support is positioned in a chemical distribution system and the crown ether polymer chelated contaminants, inline. Using the purifier of the present invention, varied low levels of impurities can be removed from chemical solutions that will come in contact with silicon wafers during the processing and production of integrated circuits. The types of impurities that can be removed using the present invention include both metallic and organic impurities. Examples of metallic impurities may include, for example, Fe, Ni, Ag, Cu, Au, Pb, and Pd.

The present invention may be used to remove any of the metals in Group IIIA and IIB of the Periodic Table of Elements. Semiconductor processing chemicals containing these impurities lead to increased silicon chip failures and decreased yields. The impurities attach to the silicon chips on the silicon wafer during, for example, washing steps.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
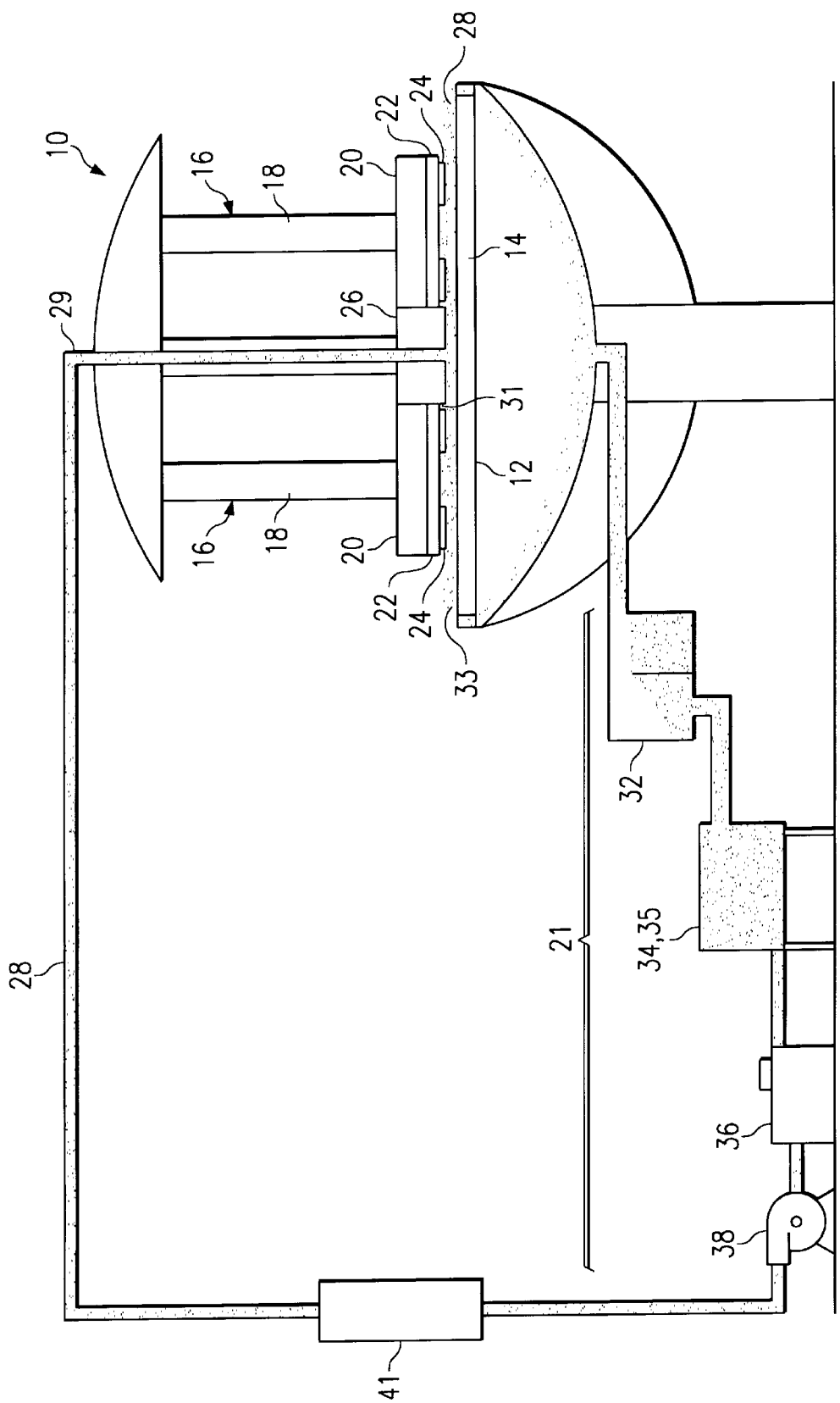
FIG. 1 is a diagram of a semiconductor chemical processing tank and system.

The present invention is an apparatus and method for decontaminating chemical solutions, referred to as wet chemicals, commonly used for processing semiconductor silicon wafers. More specifically, the present invention is a purifier used to remove ionic impurities and contaminants added during handling, transport and distribution. Using the purifier of the present invention, varied low levels of impurities can be removed from chemical solutions that come in contact with silicon wafers during the processing and production of integrated circuits. The types of impurities that can be removed using the present invention include both metallic and organic impurities. Examples of metallic impurities may include, for example, Fe, Ni, Ag, Cu, Au, Pb, and Pd. In fact, the present invention may be used to remove any of the metals in Group IIIA and IIB of the Periodic Table of Elements. Semiconductor processing chemicals containing these impurities lead to increased silicon chip failures and decreased yields. The impurities attach to the silicon chips on the silicon wafer during, for example, washing steps. The precise features of the present invention are best explained in association with the drawings. The general features of the present invention in a semiconductor wafer processing line are shown in FIG. 1 and are generally depicted as 10. The polishing apparatus 10 includes a lower platen 12 having a polishing pad 14 attached thereto on the upper surface of the lower platen 12. The polishing apparatus 10 may include a plurality of polishing units 16. Each polishing unit 16 includes a shaft 18, an upper platen 20 and a carrier plate 22. Each polishing unit 16 holds at least one semiconductor wafer 24.

In operation, the lower platen 12 and the polishing unit 16 are counter rotated such that the lower surface of the semiconductor wafers 24 contacts the upper surface of the polishing pad 14. The polishing units 16 are rotated by friction generated between the polished surface of semiconductor wafer 24 and polishing pad 14. The lower platen 12 and the upper platens 20 both rotate counterclockwise while the center drive 26 rotates clockwise while evenly distributing slurry 28 across polishing pad 14 through a circular gap between the center drive 26 and polishing pad 14.

Examples of semiconductor processing chemicals 28 may be used in the polishing apparatus 10 may include concentrated and dilute: standard clean one (SC1), standard clean two (SC2), hydrofluoric acid (HF) and deionized water, to name a few. The selection of the semiconductor processing chemical 28 that is used to process the silicon wafer 24 will depend on the type of process being performed.

Also depicted in FIG. 1 is a recirculation system 21 that comprises a series of chambers in which the slurry 28 is processed and transferred. A defoaming chamber 32 leads to a reservoir 34 which leads into the capture chamber 36 which feeds the pump 38. A deionization chamber 41 is depicted in line with the recirculation system 21. One of skill in the art, however, will note that the deionization chamber 41 can be positioned anywhere along the chemical recirculation line 21.

Figure 2:
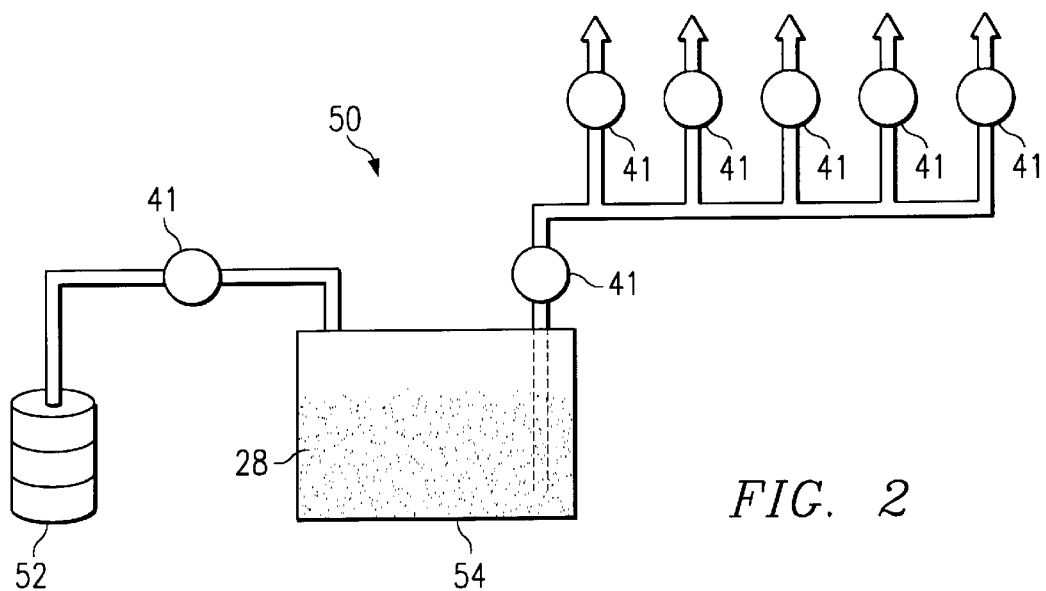
FIG. 2 is a diagram showing the different sites for purifiers of the present invention and a wet chemical supply system.

FIG. 2 depicts an alternative embodiment of the present invention in which the ion decontamination chamber 41 is depicted in several alternative positions within an in-line chemical distribution system 50. A supply drum 52 is the source of wet chemicals 28 that are delivered to a "day" tank 54. The day tank 54 feeds a series of distribution lines 56 that lead to the tools involved in wafer processing.

Figure 3:
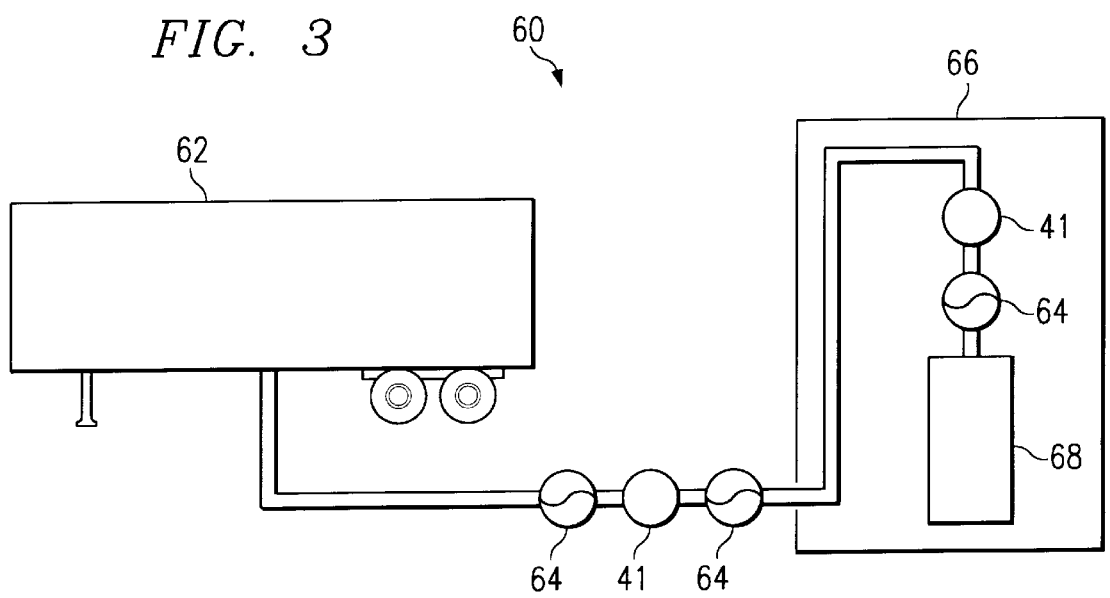
FIG. 3 is a diagram of an alternative distribution and repackaging system, showing the potential positioning for purifiers of the present invention.

FIG. 3 is a diagram of a repackaging operation 60. A tank truck 62 delivers wet chemicals 28 via a pump 64. In this embodiment, the ion decontamination chamber 41 is located outside the building prior to a second pump 64. The wet chemicals 28 then enter the chemical building 66. A second ion decontamination chamber 41 is located in front of, and in line with, a pump 64 that is located downstream from the second ion decontamination chamber 41 and feeds a mobile chemical vessel 68.

By using the in-line ion decontamination chambers 41 at different locations of in-line chemical distribution systems 50 or chemical repackaging operations 60 ionic contaminants may enter the wet chemical 28 during the handling of the wet chemicals. The source of ionic contaminants in the wet chemicals 28 can come from the different vessels such as the tank truck 62 or the supply line 52. Alternatively, an ionic contaminant can also fall into the processing systems or be leached out of the lines or pumps that circulate the wet chemicals 28.

The ion decontamination chamber 41 contains a polymerized crown ether that serves as a capture resin for ionic contaminants. Crown ethers are used in the present invention due to their ability to chelate the ionic contaminants common to wet chemicals 28 in an almost irreversible manner. Depending on the type of ionic contaminants that are found in the wet chemicals 28, different crown ethers will be used to capture the ionic contaminants. The ionic charge and size of the metal cations that is in the wet chemicals 28 will depend on the type and stage of silicon chip processing. As such, the size of the crown will be varied to address each of the different types of metal cations that are to be captured.

For smaller cations, a nesting complex will be preferred because the metal cation is small enough to enter the crown ether ring leading to complete encapsulation of the metal ion by the crown ether. For larger metal complexes and ions, a perching complex of crown ethers will be preferred as the metal cation will be too large to be captured completely within the crown ether. For moderately sized metal ions, two neighboring crown ether units can simultaneously form a sandwich complex that will also trap the metal ion.

There are different ways of forming crown ether polymers. One way to prepare a crown ether polymer is to polymerize the vinyl derivatives of crown ethers in a chain or step-like growth manner. Alternatively, crown ethers can be polymerized by grafting onto polymer matrices, cyclopolymerizing bi-functional derivatives of crown ethers, electrochemically oxidizing the polymerization of dibenzo crown ethers. In one embodiment of the present invention, the crown ethers are grafted onto immobilizing organic supports, such as polystyrene beads, cellulose derivatives, or inorganic supports, such as silica gel.

Depending on the metal ion that is going to be captured by the crown ether, different crown ethers may be selected. For example, the cavity diameter of a [12] crown-4 crown ether is between 1.2 and 1.5 angstroms, which is ideal for the capturing of small cations, such as lithium. A [15] crown-5 crown ether has a cavity diameter of 1.7 to 2.2 angstroms making it ideal for the capture of sodium cations. To capture the slightly larger potassium ion, a [18] crown-6 crown ether may be selected due to the cavity diameter of 2.6 to a 3.2 angstroms. For the larger cesium ion, which has a cation diameter of 3.38 angstroms a [21] crown-7 crown ether may be selected due to its cavity diameter of 3.4 to 4.3 angstroms. Alternatively, the ionic contaminants can be captured between adjacent crown ethers that are polymerized. The crown ether selected for the capture of ionic contaminants does not necessarily require that the crown be closed. A section open chain crown ether, commonly known as podates, can be used to capture larger ions such as rubidium.

To produce the crown ether polymers for use with the present invention, crown ether esters having pendant vinyl groups are attached to silica gel to give resins by a forced-step synthetic group shown in formula 1 hereinbelow. Since silica gel itself is a non-selective chelating material, the residual silanol groups in the functionalized silica gel are capped with trimethylsilyl groups by reaction with chlorotrimethyl silane. Mild basic hydrolysis of the immobilized crown ether ester groups with potassium hydroxide in aqueous dioxane give the silica gel bound crown ether carboxylic acid. This mild hydrolysis procedure is found to produce well shaped silica gel particles. The reaction is carried out at room temperature because if the functionalized silica gel was stirred or heated, the silica gel product exhibits serious compaction, which is attributed to deterioration of the silica gel matrix.

Crown ether ring sizes may be systematically increased by adding ethylene oxy units from 12-crown-4 to 15-crown-5 to 18-crown- 6 to 21-crown-7 to 24-crown-8. A structurally related ring size may also be used which is 14-crown-4.

The above-described crown ether rings may be used to chelate a wide variety of cations, including sodium, potassium, rubidium, cesium, and lithium. Combinations of crown ethers may be chosen to reflect the expected combinations of cations that are identified in semiconductor silicon wafer processing chemicals. The profile of cations will depend on the type of silicon wafer being processed as well as the chemical that is used for processing.

The types of crown ethers for use with the present invention include both cyclic and acyclic polyether binding sites. These cyclic or acyclic polyether-containing crown ethers can be formed by the condensation of dibenzo polyether carboxylic acids with formaldehyde. The selectivity for metal cations can be controlled by the size relationship between the crown ether cavity and the diameter of the metal ion, as well as the level of preorganized binding sites. These preorganized binding sites can be made by a combination of different crown ethers that reflect the growth of concentration of metal ions that require chelation. The relative chelation of metal cations by silica gel bound crown ethers is described below in Table 1 as described in Zhao and Bartsch, Retardation of Dibenzo Polyether-Formaldehyde Resin Formation by Alkali-Metal Cations, Journal of Polymer Science, Vol. 33 2267–2274 (1995).

TABLE 1

| Functionalized crown ether (ring size) | Sorption ($\mu$mol/g of dried resin) | | | | |
|---|---|---|---|---|---|
| | Li+ | Na+ | K+ | Rb+ | Ca+ |
| none[a] | 2.1 ± 0.5 [b] | 2.5 ± 0.9 | 3.4 ± 0.7 | 4.2 ± 1.1 | 5.3 ± 1.3 |
| 1 (12C4) | 2.1 ± 0.3 | 2.8 ± 0.4 | 4.0 ± 0.4 | 4.8 ± 0.3 | 6.4 ± 0.5 |
| 2 (12C5) | 2.7 ± 0.6 | 4.6 ± 0.6 | 8.2 ± 1.3 | 7.7 ± 1.3 | 8.21.0 |
| 3 (18C6) | 2.0 ± 0.5 | 2.8 ± 0.4 | 15.5 ± 0.6 | 8.1 ± 0.5 | 7.2 ± 0.7 |
| 4 (21C7) | 1.6 ± 0.2 | 2.1 ± 0.3 | 6.3 ± 0.9 | 10.3 ± 1.6 | 11.7 ± 1.8 |
| 5 (24C8) | 2.0 ± 0.4 | 2.4 ± 0.4 | 5.4 ± 0.4 | 7.6 ± 0.7 | 9.3 ± 1.1 |
| 6 (14C4) | 3.4 ± 0.1 | 3.5 ± 0.2 | 5.9 ± 0.3 | 7.6 ± 0.6 | 10.4 ± 1.6 |
| 7 (DB14C4)[c] | 6.7 ± 0.2 | 13.8 ± 0.1 | 7.6 ± 0.5 | 7.6 ± 1.3 | 9.2 ± 0.9 |
| 8 (DB16C5)[d] | 3.2 ± 0.3 | 10.7 ± 1.0 | 7.1 ± 0.8 | 7.9 ± 0.7 | 9.8 ± 0.8 |
| 9 (DB16C5) | 2.2 ± 0.2 | 10.9 ± 0.2 | 5.2 ± 0.3 | 5.8 ± 0.3 | 8.1 ± 0.5 |

Trimethyl silyl-capped silica get. [b] Average value and standard deviation from triplicate runs conducted with a single column. [c] DB, dibenzo. [d] Uncapped, functionalized silica gel.

The diameters for crown ether cavities and the ionic diameter of alkali metal cations are described in Table 2 hereinbelow.

TABLE 2

| Crown Ether | Cavity Size[a] (Å) | Cation | Ionic Diameter[b] (Å) |
|---|---|---|---|
| 12C4 | 1.2 | Li+ | 1.48 |
| 12C5 | 1.8 | Na | 2.02 |
| 18C6 | 2.7 | K | 2.76 |
| 21C7 | 3.3–3.5 | Rb | 2.98 |
| 24C8 | 4.1–4.3 | Cs | 3.70 |
| 14C4 | 1.2 | | |
| DB14C4[c] | 1.2 | | |
| DB16C5[c] | 1.9 | | |

[a]Estimated from space-filling models. [b]From crystallographic results for a coordination number of 6. [c]DB, dibenzo, Zhao and Bartsch, supra.

The crown ether carboxylic acid may be immobilized silica gel in the following manner. A mixture of crown ether esters with pendant vinyl groups are combined with diethoxy (methyl) silane, chloroplatinic acid, and dry benzene are refluxed for 20 hours. The mixture is filtered and evaporated in vacuo. The compound containing diethoxysilane is dissolved in chloroform and added to activated silica gel with a ratio of 1 part crown ether compound to 10 parts silica gel by weight. The chloroform is evaporated in vacuo and the solid is heated at 120 degrees centigrade for 20 hours to attached reactor methyl groups to activated silane on the surface of the silica gel. After cooling, the solid is washed with toluene, ethanol, and methanol and then dried at 60 degrees centigrade. A mixture of crown ether ester functionalized silica gel and chlorotrimethylsilane (4 parts by weight) is refluxed for 24 hours and evaporated in vacuo. The crown ether ester functionalized trimethylsilyl-capped silica gel is washed with methanol in water and diester functional groups are hydrolyzed with potassium hydroxide and 25% water and 75% dioxane solution for 24 hours at room temperature without stirring. The functionalized silica gel is washed with 3% hydrochloric acid and washed with deionized water until the pH of the eluent is 6.5. The functionalized and capped silica gel can be dried in an oven at 60 degrees centigrade for 24 hours for long term storage.

Polymers can be made by both radical and ionic polymerization methods. The reactive crown ether monomer is synthesized by attaching a polymerizable vinyl group to the crown ether compound. These vinyl crown ether polymers can be prepared from the corresponding vinyl benzo crown and vinyl dibenzo crown ethers using radical or anionic polymerization initiators. Alternatively, acrylate acrylamide benzo crown ether monomers can be synthesized by reacting (hydroxy methyl) benzocrown or aminobenzocrown ethers with acryloyl, methacryloyl chloride or acrylic anhydride. These monomers are readily converted into a polymer in which the ester amide groups connect the benzo crown ether units to the polymer backbones. Other crown ether polyacrolids and polyacrylimides without benzo groups include poly (methylene-16-crown-5 methacrylate) and poly (N-acryloyl-N-ethyl-aminomethyl-15-crown-5).

Crown ether polymers can also be formed by condensation polymerization. Condensation polymerization of bifunctional crown ether compounds can be used to incorporate crown ether units into polymer structures. One such condensation involves the synthesis of amide-type crown ether polymers. This amide-type crown ether polymer can be used to form a membrane for chelating metal ions. Other crown ether polyamides containing carboxylic acid groups in polyamides with large crown ether rings can also be produced by condensation polymerization. Other types of crown ether condensation polymers include linear polyester-type polymers, linear polyurethane-type polymers and cross-linked formaldehyde-polymers.

Formaldehyde-type condensation polymers of benzo crown and dibenzo crown ethers are usually obtained by condensation of dibenzo crown ethers with formaldehyde in formic acid or mono benzo crown ethers with formaldehyde in a mixture of formic acid and sulfuric acid using a cross-linking agent, such as phenol, resorcinol and xylol. These formaldehyde crown ether polymers are highly resistant to heat and to acidic and basic conditions.

Another type of crown ether polymer than can be made by a condensation reaction is an silyloxy crown ether polymer. The crown ether polymer is attached to dichloromethylsilane, which is subsequently hydrolyzed and formalized to form a silyloxy crown ether.

Cyclopolymerization is another method by which both crown ethers and polymer structures can be produced simultaneously. One example of such a polymer is a divinyl ether 1,2-bis (2-ethenyloxy ethoxy) benzene by cyclo polymerization. Two types of cyclopolymerization methods have been used. One uses a cationic initiator, such as $SnCl_4$, $BF_3.OEt_2$ or $HI-I_2$, to initiate the polymerization of divinyl polyethers.

The second method involves the use of a cationic initiator mentioned above or an anionic initiator such as potassium hydroxide, to cyclopolymerize diepoxy ethers. Even though the crown ether polymers formed by cyclopolymerization form part of the polymer backbone, cooperative coordination of the crown ether units lead to sandwich type complexation of large cations. In this sense the crown ether unit of the polymer is more similar to pendant crown ether moieties than the backbone incorporated crown ethers typical of crown ethers formed by condensation reactions.

Another method of forming crown ether polymers for grafting cations is by electrochemical polymerization. Electro polymerization involves the substitution of the electron donating groups of aromatic rings leading to dimerization. Under similar conditions, dibenzo crown ethers that have two electron donating substituents in the ortho position on each benzene ring trimerize to form a polytriphenylene linked by polyether bridges. One such crown ether is dibenzo-18-crown-6. To form electro-chemically polymerized crown ether polymers, a platinum anode under argon is used both neat and in dry solutions of $Bu_4 NBF_4$, $Bu_4$, $NPF_6$ or $Bu_4NClO_4$ in methylene chloride or acetonitrile. This potentiometric electrolysis is performed at a potential that corresponds to the full pitch of the oxidation peak in the cyclic voltammetry curve of the dibenzo crown ether. This electrochemical polymerization leads to a dark blue or black film that is compact and homogeneous on the electrode. This film, however, is in the p-doped state. The p-doped crown ether polymers are usually poor metal cation chelators. To improve the metal chelation ability of the crown ether polymer, it must be undoped. Two methods for undoping crown ether polymers are in common use. The first consists of an indirect chemical reduction of the materials and involves the electrogeneration of a super oxide anion in the electrode. The second method is the direct reduction of the polymers in an amine solution.

The covalent bonding of a crown ether to a silica gel matrix, for example, may be summarized as follows:

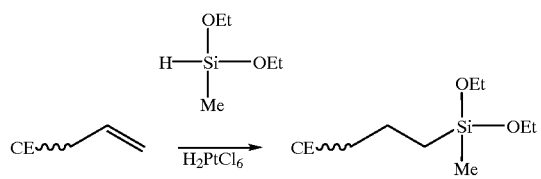

-continued

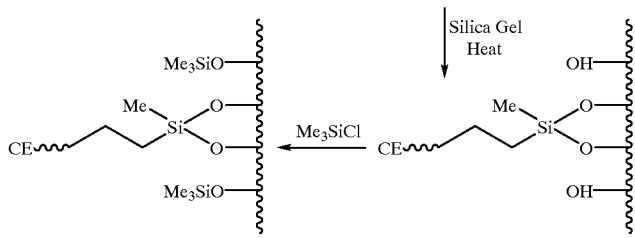

Crown ether polymers can also be formed using a Diels-Alder conjugate addition reaction, which results in the formation of a ring structure between an alkene and a diene to form the crown ether polymer. The symmetrical nature of the reaction involving crown ether allows for the formation of extended polymer structures that are capable of sequestering metals, while at the same time being resistant to non-polar solvents. This crown ether polymer can be formed into a film that is exposed to semiconductor silicon wafer processing chemicals, such as wet chemicals 28, resulting in increased bath life and savings to the industry and the environment.

In operation a crown ether such as a 18-crown-16 ether is polymerized to form a crown ether polymer. A generic Diels-Alder cyclization reaction is used to polymerize the monomers such that:

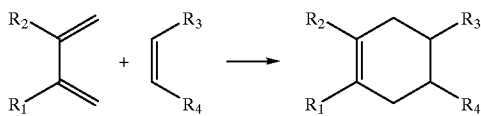

The crown ether monomers each contain the reactants that lead to cyclization and in the case of crown ethers to the formation of a polymer. The crown ether monomer can be, for example, an 18-crown-6 crown ether such as:

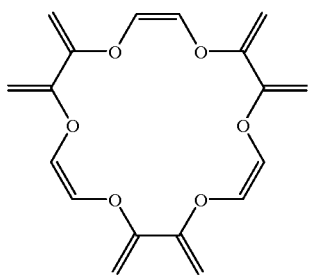

While this invention has been described with reference to illustrative embodiments, this description is not intended to be construed in a limiting sense. Various modifications and combinations of the illustrative embodiments as well as other embodiments of the invention, will be apparent to those of skill in the art upon reference to the description. It is, therefore, intended that the appended claims encompass any such modifications or embodiments.

What is claimed is:

1. An apparatus for purifying semiconductor silicon wafer processing chemicals in line comprising:

a inline non-reactive chemical support; and a crown ether polymer covalently bonded to said non-reactive support, wherein said inline non-reactive chemical support is positioned in a chemical distribution system and the crown ether polymer chelated contaminants inline.

2. The apparatus as recited in claim 1 wherein said non-reactive chemical support is a porous membrane.

3. The apparatus as recited in claim 1 wherein said non-reactive chemical support is a polystyrene membrane.

4. The apparatus as recited in claim 1 wherein said non-reactive chemical support is a fluorinated polymer.

5. The apparatus as recited in claim 1 wherein said non-reactive chemical support is silica gel.

6. The apparatus as recited in claim 1 wherein said non-reactive chemical support is polytetrafluoroethylene.

7. The apparatus as recited in claim 1 wherein the units of said crown ether polymer are:

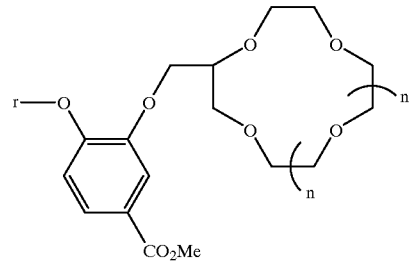

wherein r is an ethyl group, and n is an integer from 1 to 5.

8. The apparatus as recited in claim 1 wherein said crown ether polymer is further defined as being a combination of crown ether units as described in claim 7.

9. The apparatus as recited in claim 1 wherein the units of said crown ether polymer are:

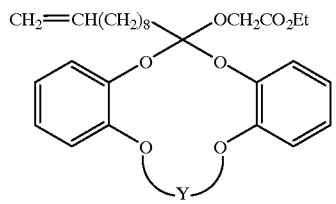

where Y is —$(CH_2)_3$— or —$CH_2CH_2OCH_2CH_2$—.

10. The apparatus as recited in claim 1 wherein said crown ether polymer is further defined as being a combination of crown ether units as described in claim 9.

* * * * *